(12) United States Patent
Nagahara

(10) Patent No.: US 10,656,891 B2
(45) Date of Patent: May 19, 2020

(54) DETERMINING WHICH COMMUNICATION STANDARD TO BE USED IN A DIRECT WIRELESS COMMUNICATION SYSTEM

(71) Applicant: CANON KABUSHIKI KAISHA, Tokyo (JP)

(72) Inventor: Ryuji Nagahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/158,960

(22) Filed: Oct. 12, 2018

(65) Prior Publication Data

US 2019/0114128 A1   Apr. 18, 2019

(30) Foreign Application Priority Data

Oct. 17, 2017 (JP) ................ 2017-201418

(51) Int. Cl.
| | |
|---|---|
| *G06F 3/12* | (2006.01) |
| *H04W 4/80* | (2018.01) |
| *H04N 1/00* | (2006.01) |
| *H04W 76/16* | (2018.01) |
| *H04W 76/14* | (2018.01) |
| *H04W 84/12* | (2009.01) |

(52) U.S. Cl.
CPC .......... *G06F 3/1287* (2013.01); *G06F 3/1204* (2013.01); *G06F 3/1231* (2013.01); *H04N 1/0001* (2013.01); *H04W 4/80* (2018.02); *H04W 76/16* (2018.02); *H04N 2201/0094* (2013.01); *H04W 76/14* (2018.02); *H04W 84/12* (2013.01)

(58) Field of Classification Search
CPC .............. G06F 3/1292; H04N 1/00106; H04N 1/00307; H04N 2201/006; H04W 4/008; H04W 76/023
See application file for complete search history.

(56) References Cited

U.S. PATENT DOCUMENTS

| | | | |
|---|---|---|---|
| 2016/0054955 A1* | 2/2016 | Nakamura | G06F 3/1204 358/1.14 |
| 2016/0255213 A1* | 9/2016 | Okazawa | H04N 1/00106 358/1.15 |
| 2017/0171414 A1* | 6/2017 | Naito | H04N 1/00973 |
| 2017/0289393 A1* | 10/2017 | Yokoyama | H04N 1/32776 |
| 2018/0024797 A1* | 1/2018 | Sako | G06F 3/1292 358/1.15 |
| 2018/0115546 A1* | 4/2018 | Ito | H04W 4/80 |

FOREIGN PATENT DOCUMENTS

JP          2017-69720 A          4/2017

* cited by examiner

*Primary Examiner* — Eric A. Rust
(74) *Attorney, Agent, or Firm* — Canon U.S.A., Inc., IP Division

(57) ABSTRACT

A MFP including a wireless network interface can set whether wireless communication based on Wi-Fi Direct® or wireless communication not based on Wi-Fi Direct® is used as direct wireless communication via the wireless network interface. The MFP provides, in a method different from the wireless communication using the wireless interface, an external device with connection information for establishing network communication between the external device and the MFP. The MFP provides different types of connection information between the case of using wireless communication based on Wi-Fi Direct® and the case of not using such wireless communication as direct wireless communication.

15 Claims, 13 Drawing Sheets

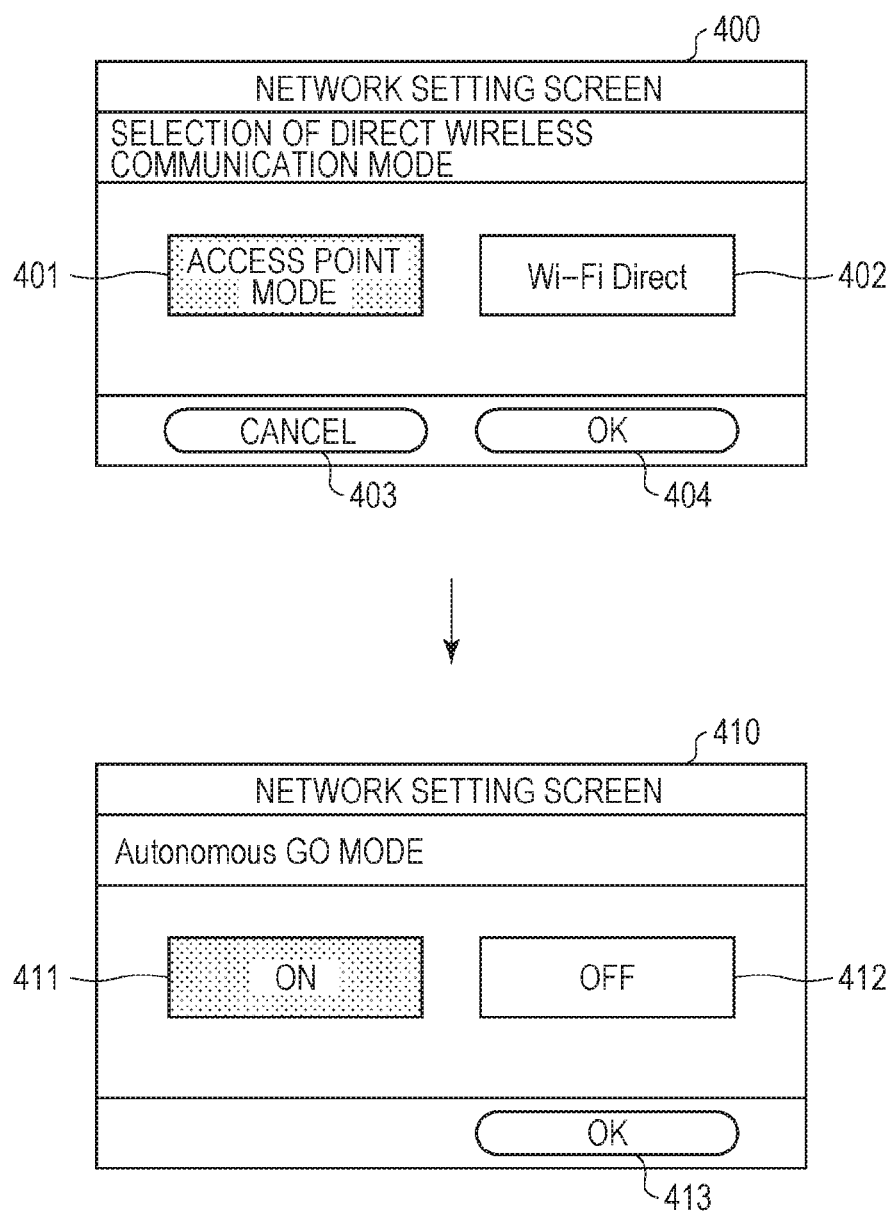

FIG. 5

| SETTING ITEMS | | | SETTING CONTENTS |
|---|---|---|---|
| NETWORK SETTINGS | | | |
| 501 — | WIRELESS LAN SETTINGS | | ON/OFF AND CONNECTION INFORMATION (SSID, PASSWORD, IP ADDRESS, etc.) |
| | DIRECT WIRELESS COMMUNICATION SETTINGS | | |
| | 502 | USE DIRECT WIRELESS COMMUNICATION | PROHIBITED/PERMITTED |
| | | MODE FOR DIRECT WIRELESS COMMUNICATION | ACCESS POINT MODE / Wi-Fi Direct MODE |
| | | TYPE OF Wi-Fi Direct MODE | Autonomous GO MODE / NEGOTIATION MODE |
| | 503 — | OPERATION SETTING UPON POWER APPLICATION | DIRECT WIRELESS COMMUNICATION ON / DIRECT WIRELESS COMMUNICATION OFF |
| 504 — | NFC SETTING | | ON/OFF |
| 505 — | Bluetooth LE SETTING | | ON/OFF |

FIG. 6
(a) CASE OF ACCESS POINT MODE
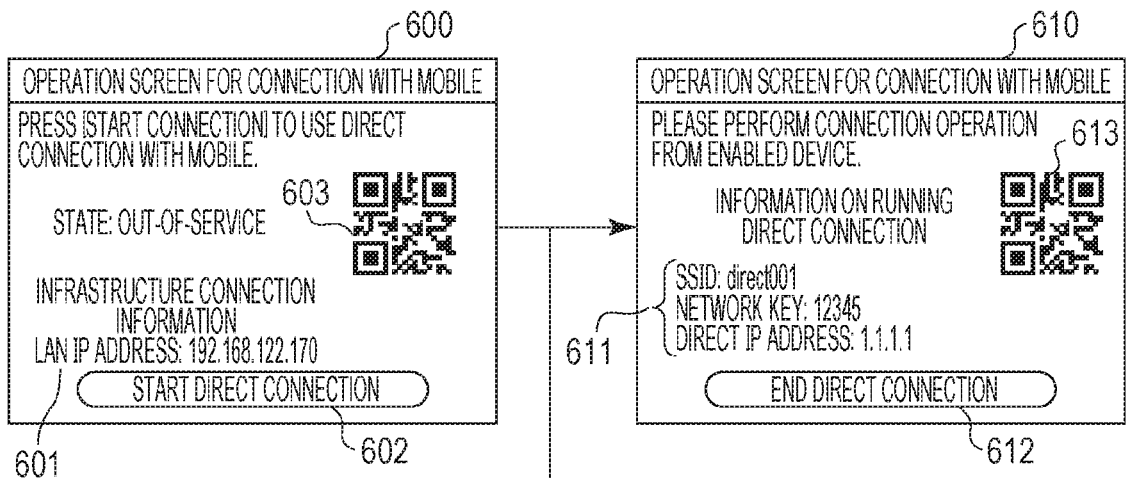
(b) Wi-Fi Direct IS ON, AND NEGOTIATION MODE
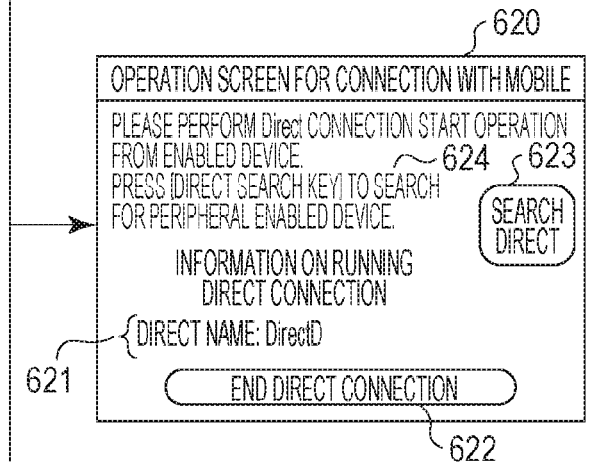
(c) Wi-Fi Direct IS ON, AND Autonomous GO MODE
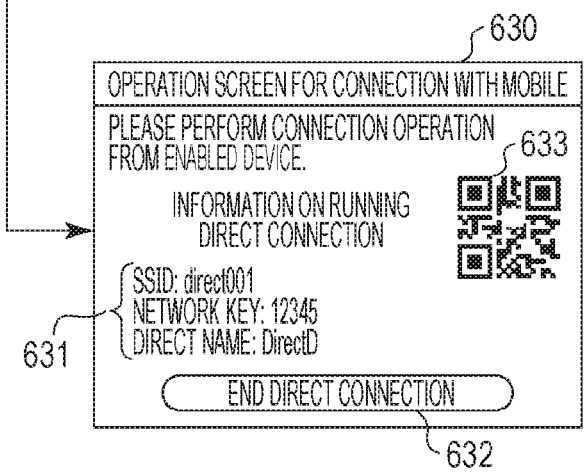

FIG. 13A

OPERATION SCREEN FOR CONNECTION WITH MOBILE — 1320

PLEASE PERFORM Direct CONNECTION START OPERATION FROM ENABLED DEVICE.
PRESS [DIRECT SEARCH KEY] TO SEARCH FOR PERIPHERAL ENABLED DEVICE.

[ SEARCH DIRECT ]

INFORMATION ON RUNNING DIRECT CONNECTION
DIRECT NAME: DirectD — 1325

FOR DEVICES PARTICIPATING IN THE SAME NETWORK, CONNECTION CAN BE MADE USING NFC, Bluetooth LE.

INFRASTRUCTURE CONNECTION INFORMATION
LAN IP ADDRESS: 192.168.122.170 — 1326

[ END DIRECT CONNECTION ]

FIG. 13B

OPERATION SCREEN FOR CONNECTION WITH MOBILE — 1330

PLEASE PERFORM CONNECTION OPERATION FROM ENABLED DEVICE.

INFORMATION ON RUNNING DIRECT CONNECTION

SSID: direct001
NETWORK KEY: 12345
DIRECT NAME: DirectD

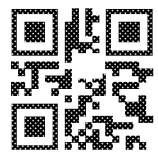

— 1335

FOR DEVICES PARTICIPATING IN SAME NETWORK, CONNECTION CAN BE MADE USING NFC, Bluetooth LE.

INFRASTRUCTURE CONNECTION INFORMATION
LAN IP ADDRESS: 192.168.122.170 — 1336

[ END DIRECT CONNECTION ]

DETERMINING WHICH COMMUNICATION STANDARD TO BE USED IN A DIRECT WIRELESS COMMUNICATION SYSTEM

BACKGROUND

Field

The present disclosure relates to an information processing device communicable with an external terminal.

Description of the Related Art

Recently, an information processing device with a wireless communication function based on IEEE 802.11 has been increasingly used. The information processing device with the wireless communication function based on IEEE 802.11 is configured to receive data from an external device, such as a PC or a mobile terminal, via an access point to execute processing based on the received data.

Among information processing devices, some devices can perform wireless communication (hereinafter referred to as "direct wireless communication") with an external device without a relay device, such as an external access point.

Some information processing devices include a near field communication function, such as near field communication (NFC). Near field communication is sometimes used for the purpose of handover to wireless communication based on IEEE 802.11 (Japanese Patent Laid-Open No. 2017-69720). An information processing device of Japanese Patent Laid-Open No. 2017-69720 is configured to transmit, to an external terminal, settings (e.g., a SSID, an encryption method, and a password) required to be used for a Wi-Fi Direct® network. The external terminal having received connection settings establishes direct wireless communication with the information processing device, and transitions to a state in which data can be transmitted to the information processing device by means of direct wireless communication.

It is assumed that any one of multiple methods is employed when direct wireless communication is established between the information processing device and the external terminal. There is the method for establishing direct wireless communication such that the information processing device operates as a software access point and the external terminal is connected with the software access point. There is the method for establishing direct wireless communication based on Wi-Fi Direct®. In Wi-Fi Direct®, one of multiple wireless communication devices forming a single group is operated as an access point, and other wireless communication devices perform P2P wireless communication with the access point. The wireless communication device operated as the access point is called a group owner (GO), and other wireless communication devices are called clients. The GO is determined by group owner negotiation. It is also assumed to cause the information processing device to act as the GO so that multiple communication terminals can be stably connected with the information processing device. It is assumed that the method to be employed from among these methods is differentiated based on the settings or operation mode of the information processing device.

In some cases, connection information used for establishing direct wireless communication is transmitted to the external terminal via near field communication, such as NFC or Bluetooth® Low Energy, and handover to direct wireless communication is performed. Alternatively, in some cases, a QR Code® including the connection information is displayed on an operation unit of the information processing device, and the external terminal reads the QR Code® to transmit the connection information for establishing direct wireless communication.

The control of properly rewriting the connection information transmitted to the communication terminal via near field communication, such as NFC or Bluetooth® Low Energy based on the settings or operation mode of the information processing device has not been typically conceived. Thus, there is a probability that when the external terminal attempts to establish direct wireless communication by means of the connection information acquired via near field communication, a connection request transmitted from the communication terminal cannot be accurately processed depending on the operation mode of direct wireless communication of the information processing device.

SUMMARY OF THE INVENTION

At least one embodiment of the present disclosure provides a mechanism for enhancing user friendliness in the case of exchanging data with an external terminal via wireless communication.

At least one embodiment of the present disclosure provides a mechanism for properly differentiating, based on the settings or status of an information processing device regarding wireless communication, connection information provided to the external terminal by means of near field communication.

An information processing device of the present disclosure includes a wireless network interface, a first setting unit configured to set whether direct wireless communication based on Wi-Fi Direct® or direct wireless communication not based on Wi-Fi Direct® is used as direct wireless communication via the wireless network interface, and a providing unit configured to provide, in a method different from wireless communication using the wireless network interface, an external device with connection information for establishing network communication between the external device and the information processing device. The providing unit controls, based on at least a setting by the first setting unit, to provide different types of connection information between the case of using direct wireless communication based on Wi-Fi Direct® and the case of using direct wireless communication not based on Wi-Fi Direct® as direct wireless communication.

Further features will become apparent from the following description of exemplary embodiments with reference to the attached drawings.

BRIEF DESCRIPTION OF THE DRAWINGS

FIG. 4 is a view for describing one example of a screen displayed on an operation unit of the MFP 101.

FIG. 5 is a table for describing one example of network settings of the MFP 101.

FIG. 6 is a view for describing one example of the screen displayed on the operation unit of the MFP 101.

FIGS. 13A and 13B are views for describing one example of the screen displayed on the operation unit of the MFP 101.

DESCRIPTION OF THE EMBODIMENTS

Hereinafter, embodiments for carrying out the present disclosure will be described with reference to the drawings. The embodiments below are not intended to limit the disclosure, and all combinations of features described in the embodiments are not necessarily essential.

First Embodiment

Figure 1:
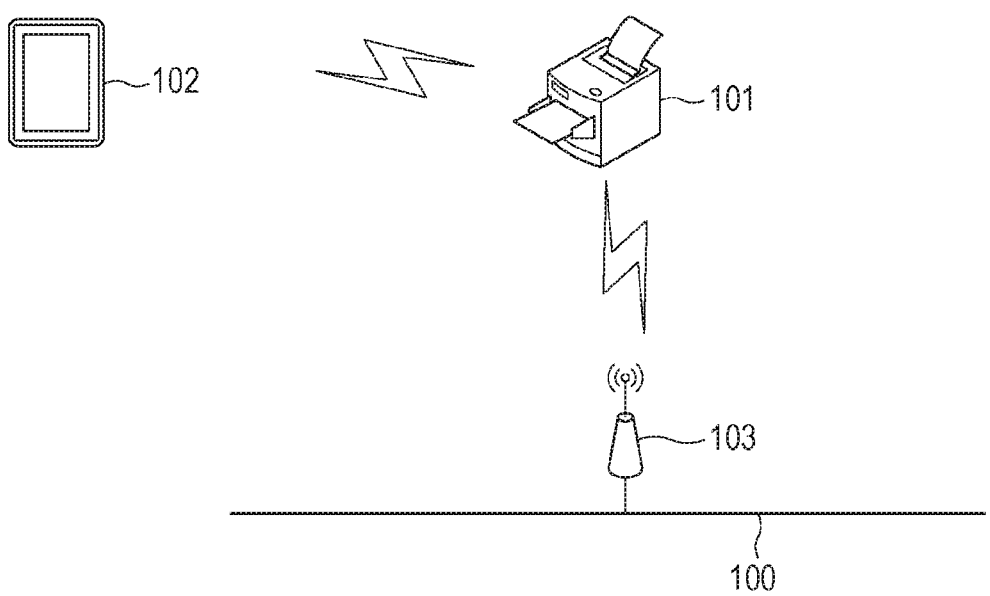
FIG. 1 is a view of one example of a communication system.

First, a configuration of a communication system according to a first embodiment will be described with reference to FIG. 1. The communication system according to the present embodiment includes a communication terminal 102 and a multifunction peripheral (MFP) 101.

The communication terminal 102 functions as a wireless client based on IEEE 802.11 standards, and can execute wireless communication via an external access point. The communication terminal 102 can also execute direct wireless communication based on Wi-Fi Direct®.

The MFP 101 is an information processing device including the printing function of receiving print data via a network to perform printing and the transmission function of transmitting data obtained by scanning to a communication terminal on the network. The MFP 101 can communicate with an external device on a LAN 100. The MFP 101 can establish direct wireless communication with a peripheral communication terminal (e.g., the communication terminal 102). The MFP 101 can perform direct wireless communication based on Wi-Fi Direct®. The MFP 101 can also perform direct wireless communication that is not based on Wi-Fi Direct®. In this case, the MFP 101 operates as a software access point (hereinafter referred to as "software AP"), and the peripheral communication terminal is connected with the software AP provided by the MFP 101 to implement direct wireless communication between devices.

A wireless network used for direct wireless communication in the present embodiment is a wireless personal area network (WPAN) based on IEEE 802.11. That is, direct wireless communication is closed wireless communication not interconnected with the LAN 100 or the Internet.

The MFP 101 is connected with the LAN 100 via an external AP 103. The MFP 101 is configured to transmit image data or information to the external device (a mail server, a file server, a PC, etc.) on the LAN 100 and receive the print data or information from the external device on the LAN 100. In the present embodiment, a connection form via an intra-network, such as the LAN 100 of an organization or a company, will be referred to as "infrastructure connection."

The communication system of the present embodiment includes the mobile cooperation function of cooperating the communication terminal 102 and the MFP 101 to provide a function to a user. For example, the scan cooperation function of scanning a paper document by cooperation of the MFP 101 and the communication terminal 102 to perform transmission or saving can be executed. The MFP 101 can execute the printing function of receiving the print data from the communication terminal 102 to print an image on a sheet based on the print data.

Such cooperation is performed after the communication terminal 102 and the MFP 101 have established a communication link for wireless communication based on IEEE 802.11. Alternatively, such cooperation is performed after communication between the communication terminal 102 and the MFP 101 via the LAN 100 has been established.

In the present embodiment, a smartphone or a tablet personal computer (PC) is assumed as one example of the communication terminal, but this example is not limiting. The smartphone or the tablet PC is one example of a communication terminal that can execute near field communication, and other communication terminals, such as a wearable device, can be employed.

In the present embodiment, the MFP has been described as one example of the information processing device configured to cooperate with the communication terminal, but this example is not limiting. For example, an information processing device such as a single-function scanner, a printer, or a 3D printer can be employed. For example, a teleconference system terminal, a car navigation device, an interactive white board, a digital signage, a contents delivery terminal, and other devices for home electronics are also applicable.

<MFP>

Figure 2:
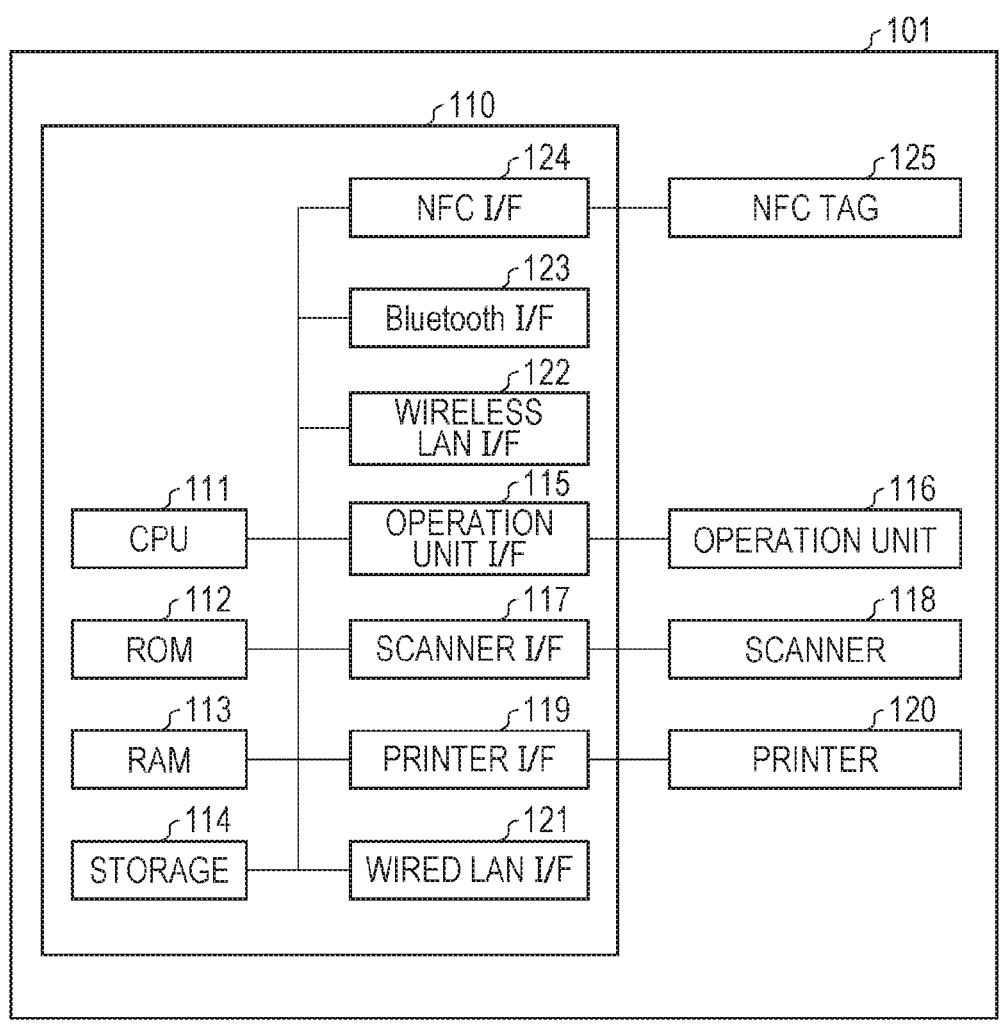
FIG. 2 is a diagram of one example of a hardware configuration of a MFP 101.

Next, the MFP 101 will be described with reference to FIG. 2. FIG. 2 is a block diagram of a hardware configuration of the MFP 101. The MFP 101 includes the reading function of reading an image and the printing function of printing an image on a sheet.

A control unit 110 including a central processing unit (CPU) 111 is configured to control operation of the MFP 101. The CPU 111 is configured to read a control program stored in a read only memory (ROM) 112 or a storage 114, thereby performing various types of control such as printing control and reading control. The ROM 112 is configured to store the control program executable by the CPU 111. A random access memory (RAM) 113 is a main storage memory of the CPU 111, and is used as a work area or a temporary storage area for developing commands of various types of control programs. The storage 114 is configured to store the print data, image data, various types of programs, and various types of setting information. Each element of the control unit 110 such as the CPU 111, the RAM 113, the ROM 112, and the storage 114 operates as a computer.

In the MFP 101 of the present embodiment, the single CPU 111 uses the single memory (the RAM 113) to execute each types of processing shown in a below-described flowchart, but other forms can be employed. For example, multiple processors, a RAM, a ROM, and a storage can cooperate to execute each type of processing illustrated in the below-described flowchart. Part of the processing can be implemented by hardware such as an application specific integrated circuit (ASIC) or a field-programmable gate array (FPGA).

An operation unit interface (I/F) 115 is configured to connect an operation unit 116 and the control unit 110 with each other. The operation unit 116 includes, for example, a liquid crystal display with a touch panel function and various hardware keys, and functions as a display unit configured to display information or a receiving unit configured to receive a user's instruction.

A scanner I/F 117 is configured to connect a scanner 118 and the control unit 110 with each other. The scanner 118 is configured to read a document to generate a read image. The generated read image is transmitted to the external device, or is used for printing.

A printer I/F 119 is configured to connect a printer 120 and the control unit 110 with each other. The printer 120 is configured to print an image on a sheet based on the print data received by the MFP 101.

The control unit 110 can be connected with a network such as the LAN 100 via a wired LAN I/F 121.

The control unit 110 includes a wireless LAN I/F 122. The wireless LAN I/F 122 is a wireless network interface for performing wireless communication based on IEEE 802.11. The CPU 111 cooperates with the wireless LAN I/F 122 to provide the wireless client function of performing wireless communication by connection with the external AP (e.g., the AP 103). The CPU 111 cooperates with the wireless LAN I/F 122 to provide the direct wireless communication function of implementing wireless communication with the peripheral communication terminal (e.g., the communication terminal 102) without use of a relay device such as the external AP. In the present embodiment, the MFP 101 operates in any of a direct wireless communication mode based on Wi-Fi Direct® and a direct wireless communication mode that is not based on Wi-Fi Direct®. Hereinafter, the direct wireless communication mode based on Wi-Fi Direct® will be referred to as a "Wi-Fi Direct® mode," and the direct wireless communication mode that is not based on Wi-Fi Direct® will be referred to as an "access point mode."

A Bluetooth® I/F 123 is an interface for transmitting data to various types of peripheral equipment and receiving data from various types of peripheral equipment via near field communication. The MFP 101 of the present embodiment can use near field communication based on Bluetooth® Low Energy to communicate with the communication terminal 102. In the present embodiment, connection information for handover to wireless communication based on IEEE 802.11 can be, via Bluetooth® Low Energy communication, notified to the external terminal having established Bluetooth® Low Energy communication. The MFP 101 can also notify the external terminal of, e.g., status information on the MFP 101 via Bluetooth® Low Energy communication.

A near field communication (NFC) I/F 124 is configured to connect an NFC tag 125 and the control unit 110 with each other. The NFC tag 125 can perform, based on global standards of ISO/IEC 21481 or ISO/IEC 18092, near field communication with a communication terminal including an NFC reader/writer. The NFC tag 125 includes a nonvolatile memory, and the nonvolatile memory is configured to store tag data to be read by the communication terminal. The tag data includes, for example, a connection information record for handover to wireless communication based on IEEE 802.11 and an activation information record for activating a cooperation application and is written into the nonvolatile memory. The control unit 110 can rewrite the tag data stored in the NFC tag 125 via the NFC I/F 124.

<Communication Terminal>

Figure 3:
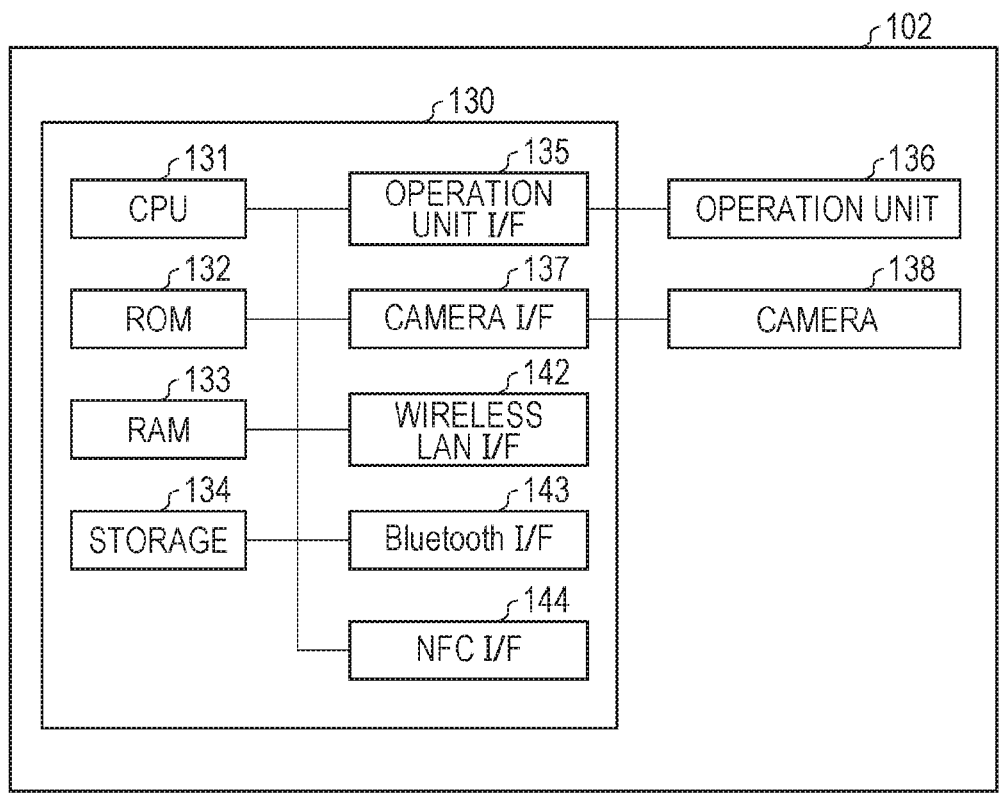
FIG. 3 is a diagram of one example of a hardware configuration of a communication terminal 102.

Next, a hardware configuration of the communication terminal 102 will be described with reference to FIG. 3. A CPU 131 included in a control unit 130 is configured to read a control program stored in a ROM 132 or a storage 134, thereby controlling the communication terminal 102.

The control unit 130 includes the CPU 131, the ROM 132, a RAM 133, the storage 134, an operation unit I/F 135, and a camera I/F 137 connected with each other via a bus. The control unit 130 includes, as communication interfaces for communicating with the external device, a wireless LAN I/F 142, a Bluetooth® I/F 143, and an NFC I/F 144.

The CPU 131 is a central processing unit (a processor) configured to control operation of the control unit 130. The RAM 133 is a volatile memory, and is used as a work area or a temporary storage area for developing various types of control programs stored in the ROM 132 and the storage 134.

The ROM 132 is a nonvolatile memory, and is configured to store, e.g., a boot program of the communication terminal 102. The storage 134 is a larger-capacity nonvolatile flash memory as compared to the RAM 133. In the storage 134, the control program of the communication terminal 102 is stored. An operating system (OS) and a cooperation application are also stored in the storage 134.

The CPU 131 is configured to execute, upon activation of the communication terminal, the boot program stored in the ROM 132. This boot program is for reading a program of the OS stored in the storage 134 to develop the program on the RAM 133. When executing the boot program, the CPU 131 subsequently executes the program of the OS developed on the RAM 133, thereby controlling the communication terminal 102. Moreover, the CPU 131 also stores, for reading/writing, data to be used for operation by the control program in the RAM 133.

The communication terminal 102 is configured to execute below-described control by the single CPU 131, but can be in other forms. For example, multiple processors can cooperate to execute the below-described control.

The operation unit I/F 135 is configured to connect an operation unit 136 and the control unit 130. The operation unit 136 includes a touch panel configured such that user's touch operation is detectable, and a display panel configured to display various types of screens. The operation unit 136 functions as a display unit configured to display information or a receiving unit configured to receive a user's instruction. Various types of screens provided by the cooperation application and the OS are displayed on the operation unit 136.

The camera I/F 137 is configured to connect the control unit 130 and a camera 138. The camera 138 is configured to capture an image based on a user's image capturing instruction. A photograph captured by the camera 138 is stored in the storage 134.

The wireless LAN I/F 142 is configured to provide the wireless client function of performing wireless communication based on the IEEE 802.11 standards. The wireless LAN I/F 142 is configured to execute wireless communication based on IEEE 802.11 by connection with the external AP. The external AP can be the MFP 101 operating in the access point mode, or can be the AP 103.

The CPU 131 can cooperate with the wireless LAN I/F 142 to establish communication with the peripheral communication terminal (e.g., the MFP 101) via direct wireless communication based on Wi-Fi Direct®.

The Bluetooth® I/F 143 is an interface for transmitting data to various types of peripheral equipment and receiving data from various types of peripheral equipment via near field communication. In the present embodiment, Bluetooth® Low Energy communication can be used to transmit data to the external device and receive data from the external device.

The NFC I/F 144 is an interface for transmitting data to various types of peripheral equipment and receiving data from various types of peripheral equipment via near field communication, and operates as an NFC reader/writer. For example, the communication terminal 102 can read the tag data stored in the NFC tag 125 of the MFP 101. When the user moves the communication terminal 102 closer to the NFC tag 125 and the communication terminal 102 enters an NFC communication range, the communication terminal 102 reads the tag data from the NFC tag 125. In this manner, the communication terminal 102 can acquire the connection information for handover to wireless communication based on IEEE 802.11 and the activation information for activating the cooperation application.

<Modes of Direct Wireless Communication>

The modes of direct wireless communication in the MFP 101 will now be described. In the present embodiment, the MFP 101 enables use of multiple methods upon utilization of direct wireless communication with the peripheral communication terminal. Specifically, operation in any of the Wi-Fi Direct® mode and the access point mode described with reference to FIG. 1 is enabled.

In the case of operation in the Wi-Fi Direct® mode, operation setting for the Wi-Fi Direct® mode is enabled. Specifically, the MFP 101 can set whether or not an Autonomous GO mode for preferentially operating as a Wi-Fi Direct® group owner (GO) is turned ON. In a case where the Autonomous GO mode is ON, the MFP 101 serves as the GO for Wi-Fi Direct® to activate the software AP. The communication terminal having found the MFP 101 operating in the Autonomous GO mode serves as a client, and transmits a connection request to the software AP to establish direct wire communication. In a case where the Autonomous GO mode is set to OFF, it is, by group owner negotiation, whether the MFP 101 or the peripheral communication terminal serves as an AP.

In the present embodiment, a case where the MFP 101 enables both the Wi-Fi Direct® Autonomous GO mode and a negotiation mode has been described as an example, but this example is not limiting. For example, the MFP 101 can enable just any of Wi-Fi Direct® modes. In this case, the connection information provided to the external terminal by means of near field communication or a QR Code® can be different between the case of the access point mode and the case of the Wi-Fi Direct® mode.

In some cases, the connection information used for establishing direct wireless communication via near field communication such as NFC or Bluetooth® Low Energy is transmitted to the external terminal, such as the communication terminal 102, and in this manner, handover to direct wireless communication is performed. In some other cases, a two-dimensional code including the connection information, such as a QR Code®, is displayed on the operation unit 116 of the MFP 101, and the external terminal reads such a QR Code® to transmit the connection information used for establishing direct wireless communication.

The control of properly rewriting the connection information used for near field communication such as NFC or Bluetooth® Low Energy based on the settings or mode of the MFP 101 has not been typically assumed. Thus, there is a probability that when the external terminal uses the connection information acquired via near field communication to establish direct wireless communication, the connection request transmitted from the communication terminal cannot be accurately processed depending on the direct wireless communication operation mode of the information processing device. That is, there is a concern that the connection information transmitted via near field communication and the method for establishing wireless communication do not match with each other and wireless direct connection cannot be accurately established.

In light of at least one of the above-described concerns, the present embodiment provides a mechanism for enhancing user friendliness in the case of exchanging data with the external terminal via wireless communication. A mechanism for properly differentiating the connection information provided to the external terminal by means of near field communication based on the settings or operation mode of the MFP 101 regarding wireless communication based on IEEE 802.11 is provided.

First, network settings of the MFP 101 will be described with reference to FIGS. 4 and 5. The user can perform setting regarding the network as one item of settings for controlling operation of the MFP 101. FIG. 4 illustrates one example of a screen displayed on the operation unit 116 of the MFP 101, and illustrates a screen for performing network setting of the MFP by way of example. FIG. 5 is a table for describing the network settings as the settings for controlling operation of the MFP 101. The user as an administrator can change each setting shown in FIG. 5 via a setting screen displayed on the operation unit 116 of the MFP 101. These network settings are stored in a nonvolatile storage area such as the storage 114, and as necessary, are referred in control in the later-described flowcharts.

Returning to description of FIG. 4, a screen 400 of FIG. 4 is one example of a screen for setting the direct wireless communication mode. The user, such as the administrator, can select, as the direct wireless communication mode, any of an access point mode key 401 or a Wi-Fi Direct® mode key 402.

In the present embodiment, the key 401 and the key 402 are exclusive settings, and any one of the keys can be turned ON. Alternatively, both the key 401 and the key 402 can be turned OFF. When both the key 401 and the key 402 are set to OFF, the MFP 101 is brought into a mode for prohibiting direct wireless communication. When any of the key 401 and the key 402 is set to ON, the MFP 101 is brought into a mode for permitting direct wireless communication.

When detecting that the key 402 is selected, the MFP 101 transitions to a screen for setting the operation mode in the Wi-Fi Direct® mode. A screen 410 of FIG. 4 is one example of the screen for setting the operation mode of the Wi-Fi Direct® mode.

The user, such as the administrator, can set whether the Autonomous GO mode is turned ON. A key 411 and a key 412 are exclusive settings, and any one of the keys can be turned ON. When detecting that an OK key 413 is selected, the MFP 101 stores, as the network settings, settings regarding the Wi-Fi Direct® operation mode set via the screen 410, and returns the screen displayed on the operation unit 116 to the screen 400.

When the Autonomous GO mode is changed to ON via the key 411, the Autonomous GO mode is set as the operation mode of the Wi-Fi Direct® mode. When the Autonomous GO mode is changed to OFF via the key 412, the negotiation mode is set as the operation mode of the Wi-Fi Direct® mode.

Returning to description of FIG. 4, a cancel key 403 is a key used when the settings made via the screen 400 are rejected and ended. An OK key 404 is a key used when the settings made via the screen 400 are applied. When detecting that the OK key 404 is selected, the MFP 101 sets, as the network settings, the settings made regarding the direct wireless communication mode via the screen 400, and the screen displayed on the operation unit 116 transitions to a screen at the next upper hierarchical level. The next upper hierarchical level is, for example, a network setting screen (not illustrated).

The network settings made via the screens of FIG. 4 are stored in the nonvolatile storage area, such as the storage 114, and as necessary, are referred in, e.g., the control in the below-described flowcharts. Other network settings can be also made by the administrator etc. via the operation unit 116.

The network settings according to the present embodiment will be described with reference to FIG. 5. As illustrated in FIG. 5, setting items changeable at the MFP 101 include settings 501 as a wireless client. The present embodiment is described assuming that the wireless LAN I/F 122 is set to ON and the connection information (a service set identifier (SSID), a password, an IP address, etc.) for connection with the external AP is set. The settings made through FIG. 4 are stored as settings 502. In the present embodiment, the administrator can set, as a setting regarding direct wireless communication, a setting 503 as an operation setting upon power application. In a case where it is, as the setting 503, set such that direct wireless communication is turned ON, the CPU 111 controls such that the MFP 101 is activated with the direct wireless communication function being ON. In a case where it is, as the setting 503, set such that direct wireless communication is OFF, the CPU 111 controls such that the MFP 101 is activated with the direct wireless communication function being OFF.

It is, as a setting 504, set whether external cooperation via NFC is to be used, and it is, as a setting 505, set whether external cooperation via Bluetooth® Low Energy is to be used.

The start or stop of direct wireless communication will be described with reference to FIG. 6. FIG. 6 illustrates one example of the screen displayed on the operation unit 116 of the MFP 101 and one example of screen transition.

The user of the MFP 101 selects a key (a display item) for using a copy function or a scan function of the MFP 101 via a main menu screen (not illustrated) displayed on the operation unit 116 so that each function of the MFP can be used. On the main menu, a mobile cooperation key used upon cooperation with the communication terminal 102, such as the smartphone or the tablet terminal, is prepared. In association with selection of the mobile cooperation by the user, the MFP 101 causes the screen displayed on the operation unit 116 to transition to a mobile portal screen illustrated in FIG. 6.

The user can confirm, via the mobile portal screen, information upon connection between the communication terminal 102 and the MFP 101 via direct wireless communication. Based on user operation via the operation unit 116, the CPU 111 causes the MFP 101 to transition from a direct wireless communication stop state to an execution state, or causes the MFP 101 to transition from the execution state to the stop state.

A screen 600 of FIG. 6 is one example of the mobile portal screen displayed on the operation unit 116 in the direct wireless communication stop state. In a case where direct wireless communication is stopped, direct wireless communication cannot be performed, but communication via the LAN 100 connected with the MFP 101 can be performed. On the screen 600, information 601 is displayed as connection information used in communication via the LAN 100. On the screen 600, a QR Code® 603 including connection information such as an IP address for accessing the MFP 101 from the LAN 100 is displayed. The cooperation application installed in the communication terminal 102 reads the QR Code® 603 by means of the camera 138 of the communication terminal 102, thereby acquiring the connection information. The cooperation application can use the acquired connection information to communicate with the MFP 101 via the LAN 100. In a state in which direct wireless communication is stopped, the MFP 101 controls the connection information provided to the external terminal via NFC or Bluetooth® Low Energy to be the connection information including the IP address for accessing the MFP 101 from the LAN 100. By such processing, the MFP 101 can properly notify the communication terminal 102 of the connection information for accessing the MFP 101 via the LAN 100 by means of near field communication.

A start key 602 is a key used upon switching to the direct wireless communication execution state. Based on the network settings, the MFP 101 can display the start key as gray-out and can deactivate the start key. Specifically, the CPU 111 refers to the settings 502 stored in the storage 114, and in a case where use of direct connection is prohibited, the start key 602 is displayed as gray-out. When detecting that the grayed-out start key 602 is selected, the CPU 111 displays pop-up such as "Direct wireless communication cannot be used under current settings. Please contact administrator."

In a case where the start key 602 is valid, the CPU 111 starts control regarding direct wireless communication based on the network settings described with reference to FIG. 5 in association with selection of the start key 602 by the user. In a case where the direct wireless communication mode is set to the "access point mode," the MFP 101 controls the wireless LAN I/F 122 to activate the software AP for direct wireless communication. The MFP 101 causes the screen displayed on the operation unit 116 to transition to a confirmation screen for the access point mode. A screen 610 is an example of the confirmation screen for the access point mode. On the screen 610, information 611 regarding the currently-activated software AP is displayed. On the screen 610, a QR Code® 613 including the connection information such as a SSID, a network key, and an IP address is displayed. An end key 612 is a key used when the software AP is stopped. In association with selection of the end key 612 by the user, the MFP 101 stops the activated software AP to transition to the direct wireless communication stop state. When stop processing is completed, the MFP 101 transitions the screen displayed on the operation unit 116 to the screen 600.

The cooperation application installed in the communication terminal 102 uses the camera 138 of the communication terminal 102 to read the QR Code® 613, thereby acquiring the connection information. The cooperation application is connected with the software AP by means of the acquired connection information, thereby participating in the wireless network provided by the software AP. The cooperation application can be connected with the software AP in such a manner that the user inputs the SSID or the network key. The user can view the information 611 to grasp the connection information required to be input to a print application. In association with the start of the access point mode, the CPU 111 also rewrites NFC connection information or Bluetooth® Low Energy connection information to information for connection with the direct wireless communication software AP activated by the MFP 101. By such processing, the MFP 101 can properly notify the communication terminal 102 of the connection information for direct wireless communication via various types of near field communication.

In a case where the direct wireless communication mode is set to the "Wi-Fi Direct® mode," the MFP 101 further differentiates the control by the Wi-Fi Direct® operation mode. Specifically, in a case where the "Wi-Fi Direct® mode" is set and the Wi-Fi Direct® operation mode is set to the "negotiation mode," the MFP 101 causes the screen displayed on the operation unit 116 to a screen 620. Moreover, the MFP 101 transitions to an operation mode for standing by for a Wi-Fi Direct® connection request from the external device or searching a peripheral Wi-Fi Direct® enabled device via the operation unit 116.

At this point, in a case where the operation mode is set to the "negotiation mode," it is, after group owner negotiation, determined whether the MFP 101 or the external device serves as GO. Thus, at the timing of transitioning to the screen 620, the MFP 101 does not launch the software AP. Thus, only information 621 indicating a direct name for identifying the device via Wi-Fi Direct® is displayed as the connection information displayed on the screen 620. In the present embodiment, the direct name for identifying the device will be also referred to as a "device name." Information 624 indicating that connection start operation is available from the device enabling Wi-Fi Direct® and that a search key is pressed to enable searching of the peripheral enabled device from the MFP 101 is displayed on the screen 620. A direct search key 623 is a key used when the peripheral Wi-Fi Direct® enabled device is searched from the MFP 101. When receiving the Wi-Fi Direct® connection request from the external terminal (e.g., the communication terminal 102), the MFP 101 proceeds to group owner negotiation to establish the communication link for wireless communication with the external terminal based on Wi-Fi Direct®. The Wi-Fi Direct® connection request is transmitted from the MFP 101 to the external terminal found by searching so that wireless communication can be established.

In association with the start of the negotiation mode, the CPU 111 also rewrites the NFC connection information or the Bluetooth® Low Energy connection information to the information indicating the direct name. By such processing, the MFP 101 can properly notify the communication terminal 102 of the connection information for direct wireless communication via various types of near field communication.

An end key 622 is a key used when direct wireless communication based on Wi-Fi Direct® is stopped. In association with selection of the end key 622 by the user, the MFP 101 stops standby for Wi-Fi Direct® to transition to the direct wireless communication stop state.

Finally, in a case where the "Wi-Fi Direct® mode" is set and the Wi-Fi Direct® operation mode is set to the "Autonomous GO mode," the MFP 101 causes the screen displayed on the operation unit 116 to transition to a screen 630. The MFP 101 transitions to the mode for standing by for the Wi-Fi Direct® connection request from the external device, and activates the access point used for Wi-Fi Direct®.

Information 631 including the information on connection with the currently-activated software AP and the information indicating the direct name for identifying the device via Wi-Fi Direct® is displayed on the screen 630. A QR Code® 633 including the connection information, such as a SSID, a network key, and a direct name, is displayed on the screen 630. An end key 632 is a key used when direct wireless communication based on Wi-Fi Direct® is stopped.

The OS of the communication terminal 102 reads the QR Code® 633 by means of the camera 138 of the communication terminal 102, thereby acquiring the connection information on wireless communication based on Wi-Fi Direct®. The OS is connected to the software AP by means of the acquired connection information, thereby participating in the wireless network provided by the software AP. The OS can cause the user to select the Wi-Fi Direct® software AP found by searching, thereby establishing wireless communication with the software AP found by searching. The user can view the information 631 to grasp the software AP required to be selected. In association with the start of the GO mode, the CPU 111 also rewrites the NFC connection information or the Bluetooth® Low Energy connection information to the connection information for connection with the Wi-Fi Direct® software AP and the information including the direct name. By such processing, the MFP 101 can properly notify the communication terminal 102 of the connection information for direct wireless communication via various types of near field communication.

A specific control method for properly differentiating the connection information provided to the external terminal by means of near field communication will be described with reference to flowcharts of FIGS. 7 to 8 and FIGS. 10 to 11.

FIGS. 7 to 8 and FIGS. 10 to 11 are the flowchart of the control of the MFP 101. Each type of operation (each step) illustrated in the flowcharts of FIGS. 7 to 8 and FIGS. 10 to 11 is implemented in such a manner that the CPU 111 reads and executes the program for implementing each control module in the RAM 113, the program being stored in the ROM 112 or the storage 114. Part of the processing is implemented by cooperation with the interfaces such as the wireless LAN I/F 122, the Bluetooth® I/F 123, and the NFC I/F 124.

Figure 7:
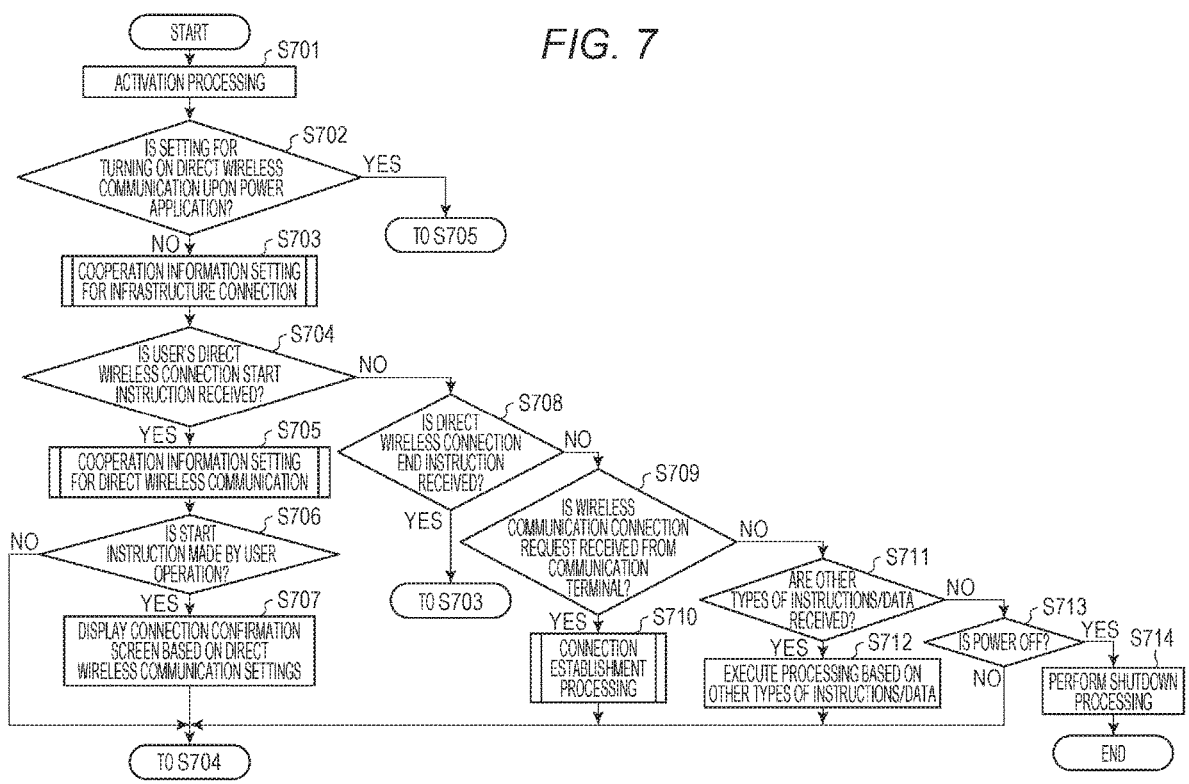
FIG. 7 is one example of a flowchart of control of the MFP 101.

FIG. 7 is the flowchart of operation of the MFP 101 executed when power is supplied to the MFP 101 to activate the MFP 101.

At S701, the CPU 111 executes activation processing. When the processing of activating the scanner 118 and the printer 120 proceeds to the stage of performing network setting, the CPU 111 proceeds the processing to S702. At S702, the CPU 111 refers to whether a setting for turning ON direct wireless communication is made upon power application. The CPU 111 refers to the settings 502 stored in the storage 114. In a case where the setting for turning ON direct wireless communication is made as an operation setting upon power application, the processing proceeds to S705. In a case where the setting for turning ON direct wireless communication is not made as the operation setting upon power application, the processing proceeds to S703.

At S703, the CPU 111 performs the processing of setting cooperation information for infrastructure wireless communication. Specific processing will be described with reference to the flowchart of FIG. 8.

At S801, the CPU 111 acquires infrastructure connection information. Specifically, the CPU 111 refers to the settings 501 as the wireless client stored in the storage 114 to acquire the IP address as the connection information used for infrastructure connection by the MFP 101. The present embodiment describes, as one example, a case where the wireless client function of the wireless LAN I/F 122 is utilized for connection with the LAN 100 via the external AP, but this example is not limiting. For example, connection with the LAN 100 via the wired LAN I/F 121 is also applicable. In this case, the CPU 111 acquires, as the connection information, the IP address of the MFP 101 stored as the setting of the wired LAN (not illustrated).

At S802, the CPU 111 determines whether a setting for using NFC is made. Specifically, the CPU 111 refers to the setting 504, which is stored in the storage 114, for whether external cooperation via NFC is to be used. In a case where the setting 504 is set to ON, the processing proceeds to S803. In a case where the setting 504 is set to OFF, the processing proceeds to S804.

At S803, the CPU 111 writes the tag data in the NFC tag 125 based on the infrastructure connection information acquired at S801. The CPU 111 writes the infrastructure connection information in the connection information record for handover to wireless communication. The tag data written at this point also includes an identification information record for activating the cooperation application.

At S804, the CPU 111 writes blank data in the NFC tag. Such processing is exceptional processing in a case where a setting for not using external cooperation via NFC is made.

At S805, the CPU 111 determines whether a setting for using Bluetooth® Low Energy is made. Specifically, the CPU 111 refers to the setting 505, which is stored in the storage 114, for whether external cooperation via Bluetooth® Low Energy is to be used. In a case where the setting 505 is set to ON, the processing proceeds to S806. In a case where the setting 505 is set to OFF, the processing proceeds to S808.

At S806, the CPU 111 sets characteristics used for generic attributes (GATT) communication via Bluetooth® Low Energy based on the infrastructure connection information.

Figure 9:
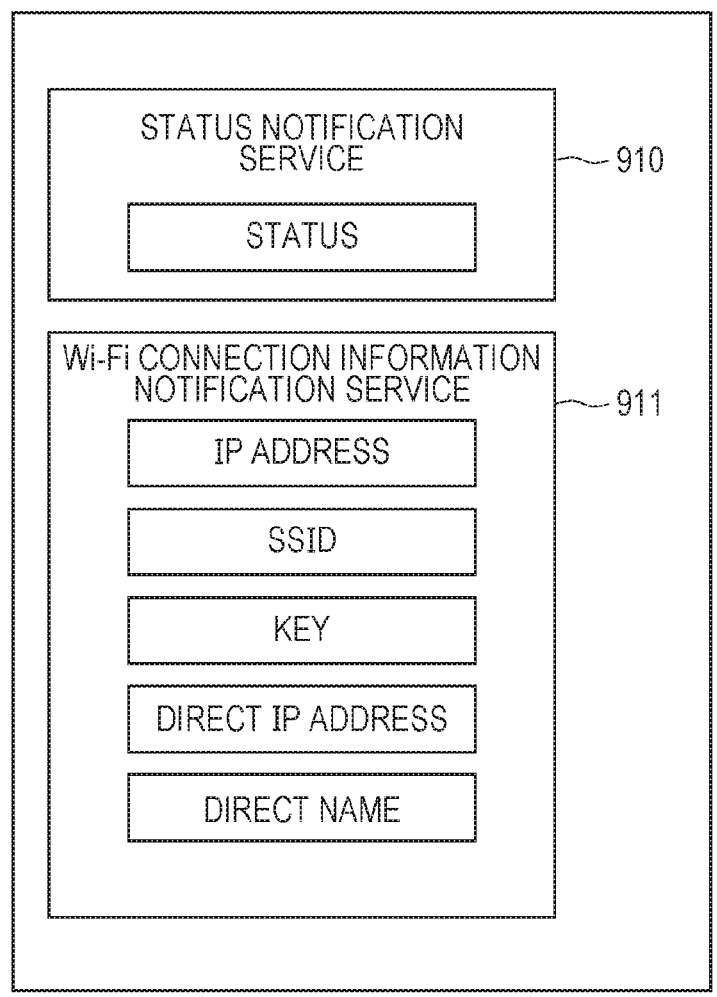
FIG. 9 is a view for describing data communication using Bluetooth LE.

GATT communication will be described herein. The MFP 101 of the present embodiment includes a GAIT server for which a GATT profile for transmitting data to the external terminal and receiving data from the external terminal via Bluetooth® Low Energy is defined. FIG. 9 is a view for describing GATT communication, and illustrates one example of the GATT server released by the MFP 101. In the GATT server, a status notification service 910 and a Wi-Fi® connection information notification service 911 are released.

Each service includes the characteristic(s) defined in the GATT profile. The profile and the characteristics in GAIT are as in a relationship between a class and a member variable in an object-oriented design. The status notification service 910 is a service for notifying the state of the MFP. When the status of the MFP 101 changes, the CPU 111 writes the status in a "Status" value as the characteristic. For example, a state such as a sleep state or a normal mode of the MFP is written in the characteristic. The communication terminal 102 reads the characteristic of "Status" so that the status of the MFP 101 can be acquired.

The Wi-Fi® connection information notification service 911 is a service for notifying the communication terminal of information on connection with the MFP. These services are, as necessary, used in a case where wireless communication used between the devices is handed over from Bluetooth® Low Energy communication to wireless communication based on IEEE 802.11.

Figure 8:
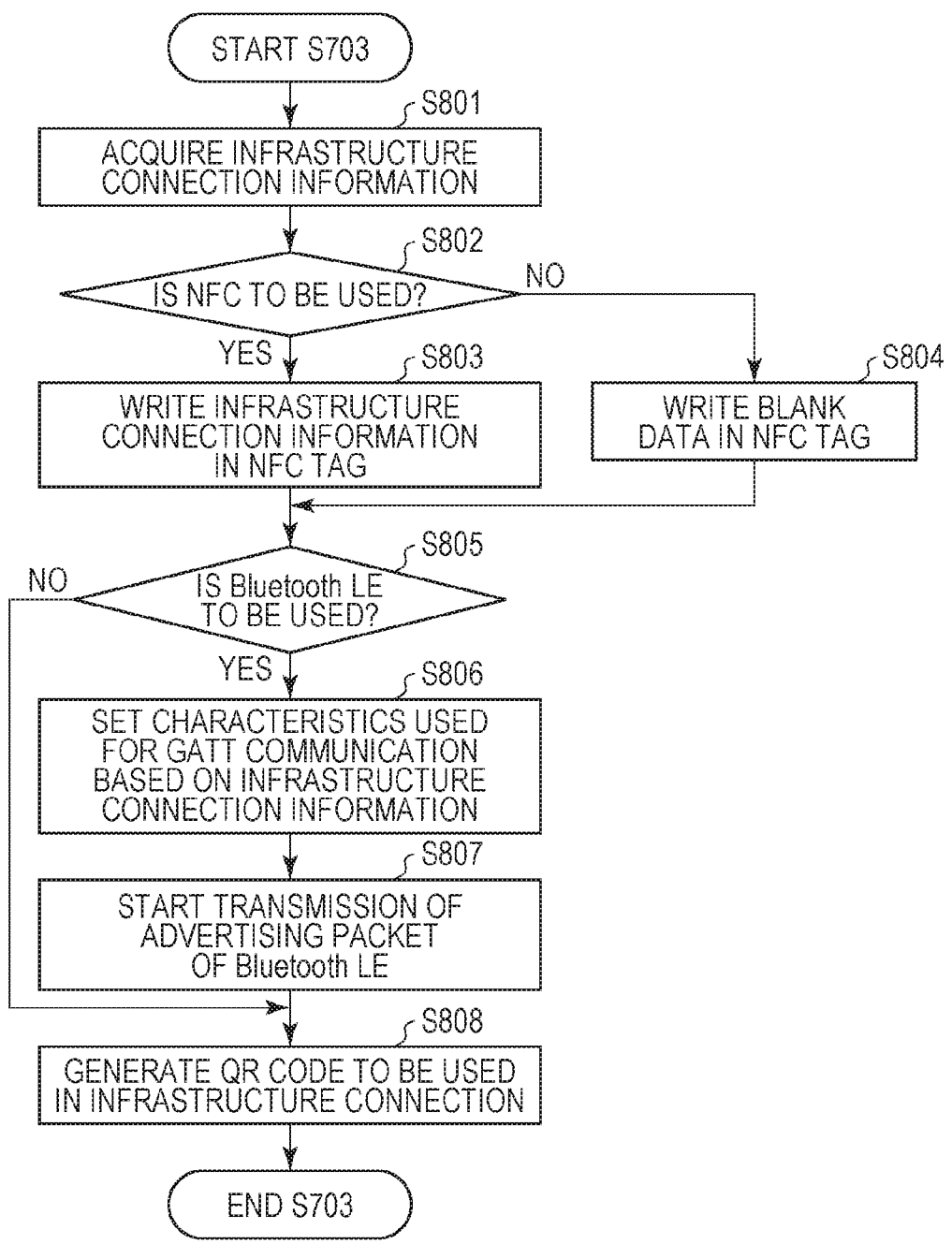
FIG. 8 is one example of the flowchart of the control of the MFP 101.

Returning to the description of FIG. 8, the CPU 111 rewrites, as necessary, the characteristics of the Wi-Fi® connection information notification service 911 of the GATT server in the processing of S806. Specifically, the IP address for infrastructure connection is set for the characteristic of the IP address, and NULL is set for other characteristics. By such processing, the communication terminal 102 can set the connection information that can be acquired via Bluetooth® Low Energy communication to the IP address for infrastructure connection.

At S807, the CPU 111 cooperates with the Bluetooth® I/F 123 to start transmission of an advertising packet of Bluetooth® Low Energy. The advertising packet is, for example, delivered at an interval of several tens of msec.

When receiving the advertising packet, the communication terminal 102 transmits a Bluetooth® Low Energy connection request to the MFP 101 based on information included in the advertising packet. Connection request processing will be described below with reference to the flowchart of FIG. 11. When Bluetooth® Low Energy communication is established in response to the connection request, the characteristics of the GATT server described with reference to FIG. 10 can be read from the communication terminal 102, and can be written in the communication terminal 102. When transmission of the advertising packet begins, the CPU 111 proceeds to S808.

At S808, the CPU 111 generates a QR Code® used for infrastructure connection based on the connection information acquired at S801. The generated QR Code® is displayed on the screen 600 illustrated as an example in FIG. 6, for example. When the processing of generating the QR Code® is completed, the processing proceeds to S704 of FIG. 7. By a series of processing described with reference to FIG. 8, the IP address for infrastructure connection can be set as handover information for various types of near field communication under a situation where direct wireless communication is not used.

Returning to the description of FIG. 7, the CPU 111 determines, at S704, whether an instruction for starting direct wireless communication by the user has been received. In a case where the instruction for starting direct wireless communication by the user has been received, the processing proceeds to S705. In a case where the instruction for starting direct wireless communication by the user is not received yet, the processing proceeds to S708. The instruction for starting direct wireless communication by the user is, for example, pressing of the direct connection start key 602 on the screen 600.

At S705, the CPU 111 performs the processing of setting the cooperation information for direct wireless communication. Specific processing will be described with reference to the flowchart of FIG. 10. At S1001, the CPU 111 determines the type of direct wireless communication mode. Specifically, the direct wireless communication settings 502 stored in the storage 114 are referred. In a case where the access point mode is set as the direct wireless communication mode, the processing proceeds to S1002. In a case where the Wi-Fi Direct® mode is set as the direct wireless communication mode, the processing proceeds to S1003.

At S1002, the CPU 111 generates the connection information including the SSID and network key of the software AP used for the access point mode and the IP address for connection with the MFP 101, and proceeds the processing to S1006.

At S1003, the CPU 111 determines the type of Wi-Fi Direct® mode. Specifically, the direct wireless communication settings 502 stored in the storage 114 are referred. In a case where the negotiation mode is set as the Wi-Fi Direct® mode, the processing proceeds to S1004. In a case where the Autonomous GO mode is set as the Wi-Fi Direct® mode, the processing proceeds to S1005.

At S1004, the CPU 111 generates the connection information including the direct name and not including the SSID and the network key. In the case of operation in the negotiation mode, it is not determined which one of the MFP 101 or the peripheral terminal serves as the Wi-Fi Direct® access point, and therefore, the SSID and the network key are not included as the connection information.

At S1005, the CPU 111 generates the connection information including the SSID, the network key, and the direct name. In the case of operation in the Autonomous GO mode, the MFP 101 activates the software AP as the Wi-Fi Direct® group owner. Thus, the SSID, the network key, and the direct name for connection with the software AP are included.

At S1006, the CPU 111 determines whether the setting for using NFC is made. Specifically, the CPU 111 refers to the setting 504, which is stored in the storage 114, for whether external cooperation via NFC is to be used. In a case where the setting 504 is set to ON, the processing proceeds to S1007. In a case where the setting 504 is set to OFF, the processing proceeds to S1008.

At S1007, the CPU 111 writes the tag data in the NFC tag based on the generated connection information. The CPU 111 writes the generated connection information in the connection information record for handover to wireless communication. The tag data written herein includes, for example, the activation information record for activating the cooperation application.

At S1008, the CPU 111 writes the blank data in the NFC tag. Such processing is exceptional processing in a case where the setting for not using external cooperation via NFC is made.

At S1009, the CPU 111 determines whether the setting for using Bluetooth® Low Energy is made. Specifically, the CPU 111 refers to the setting 505, which is stored in the storage 114, for whether external cooperation via Bluetooth® Low Energy is to be used. In a case where the setting 505 is set to ON, the processing proceeds to S1010. In a case where the setting 505 is set to OFF, the processing proceeds to S1012.

At S1010, the CPU 111 sets the characteristics used for GATT communication of Bluetooth® Low Energy based on the generated connection information.

For example, in the access point mode, the characteristics of "SSID," "KEY," and "Direct IP Address" are set based on the connection information generated at S1002, and other characteristics are set to NULL. For example, in the Autonomous GO mode, the characteristics of "SSID," "KEY," and "DIRECT NAME" are set based on the connection information generated at S1005, and other characteristics are set to NULL. For example, in the negotiation mode, the characteristic of "DIRECT NAME" is set based on the connection information generated at S1004, and other characteristics are set to NULL. By the processing of S1010, proper connection information can be provided according to the operation mode and settings of direct wireless connection.

Figure 10:
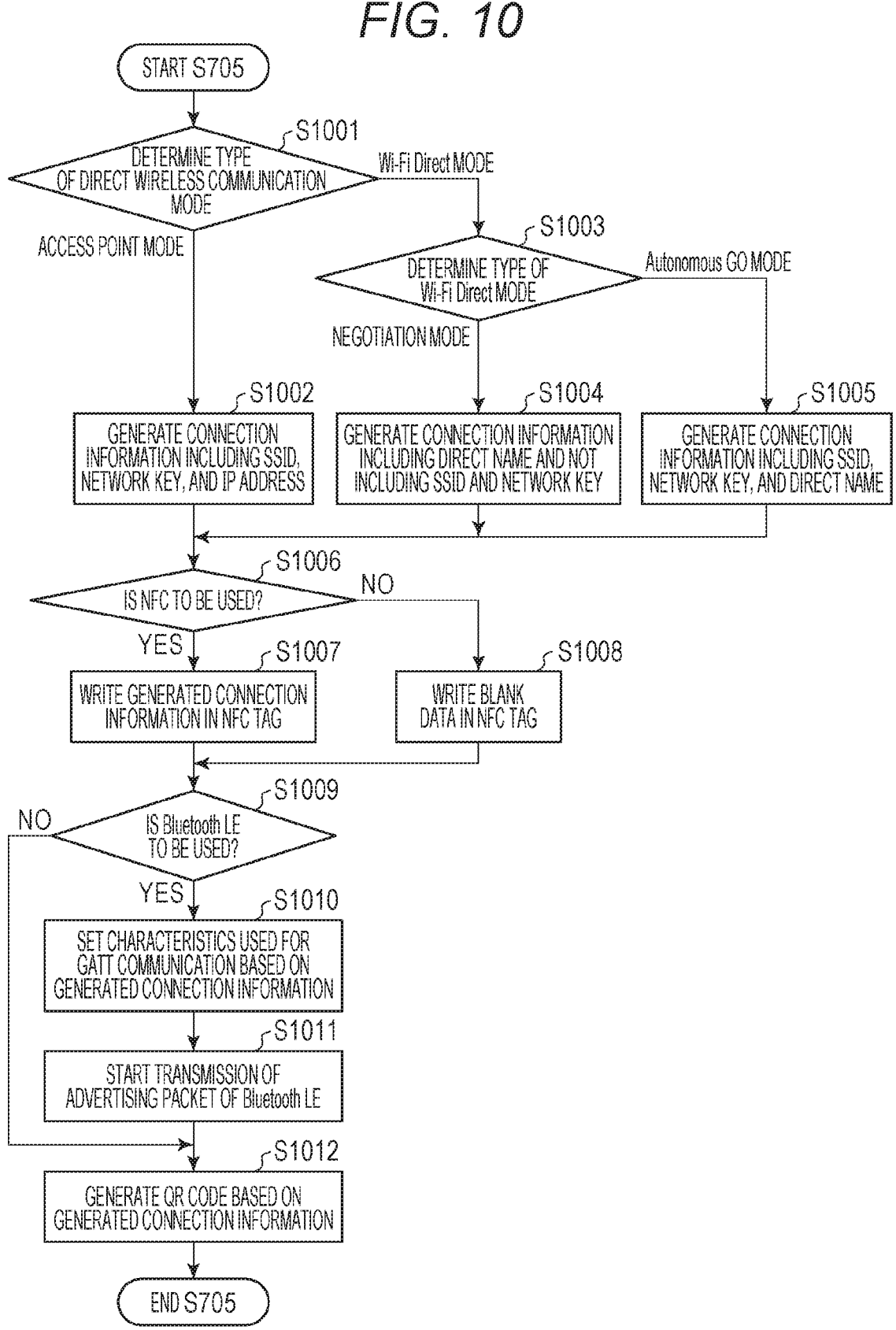
FIG. 10 is one example of the flowchart of the control of the MFP 101.
Figure 11:
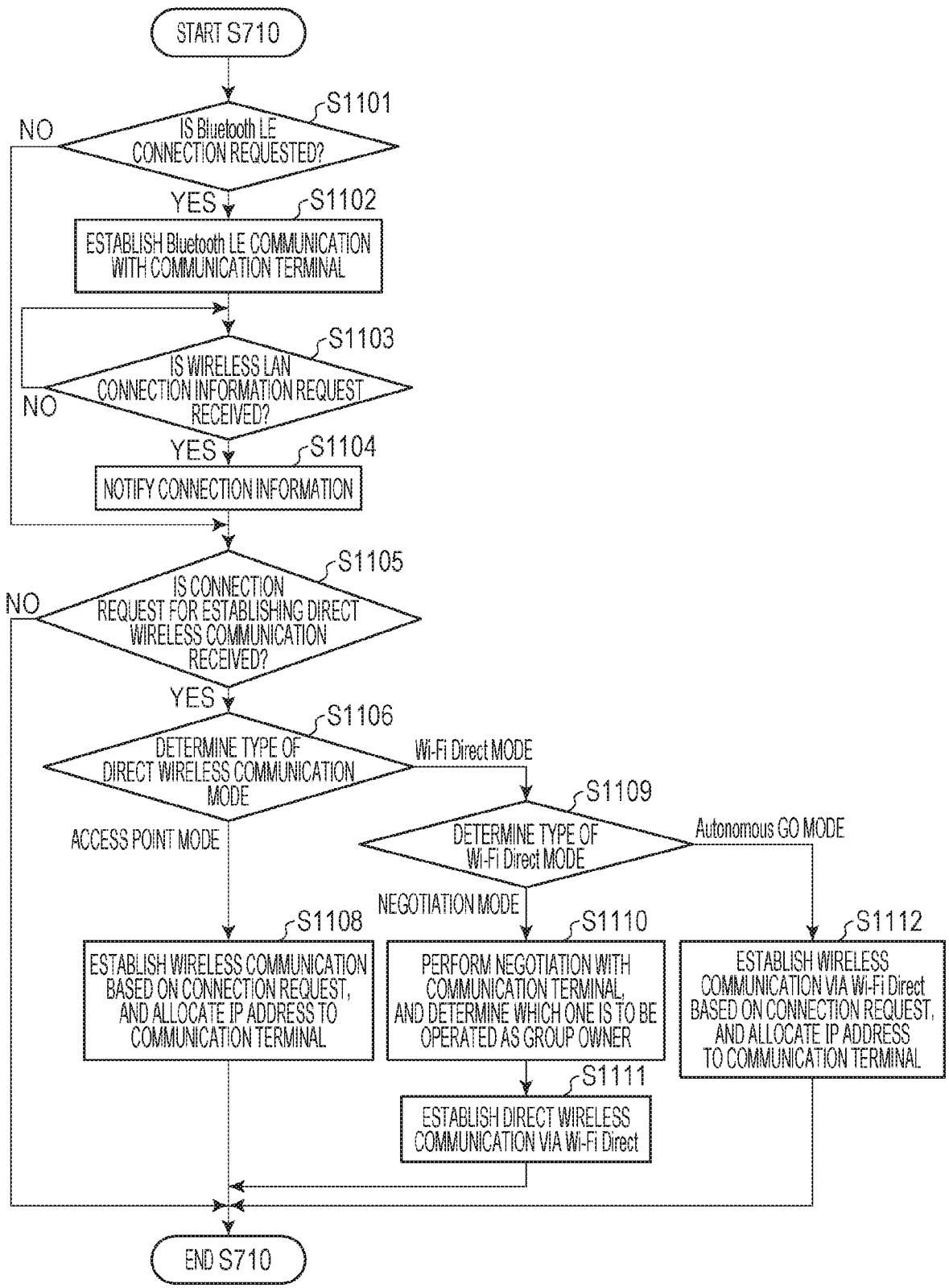
FIG. 11 is one example of the flowchart of the control of the MFP 101.

Returning to the description of FIG. 10, the CPU 111 cooperates, at S1011, with the Bluetooth® I/F 123 to start transmission of the advertising packet of Bluetooth® Low Energy.

At S1012, the CPU 111 generates a QR Code® based on the generated connection information. The generated QR Code® is displayed on the screen illustrated as an example in FIG. 6, for example. By the processing of FIG. 10, proper connection information can be provided based on the settings and operation mode of direct wireless communication under a situation where direct wireless communication is used. When generation of the QR Code® is completed, the CPU 111 proceeds the processing to S706 of FIG. 7.

Returning to description of FIG. 7, the CPU 111 determines, at S706, whether the instruction for starting direct wireless communication is made by user operation. In a case where the instruction for starting direct wireless communication is made by user operation, the processing proceeds to S707. In a case where the instruction for starting direct wireless communication is not made by user operation (e.g., a case where the processing proceeds to S705 by processing upon activation), the processing of S707 is skipped, and the processing proceeds to S704.

At S707, the CPU 111 displays the confirmation screen based on the settings of direct wireless communication. For example, in the case of the access point mode, the screen 610 described with reference to FIG. 6 is displayed. In the case of the Autonomous GO mode, the screen 630 described with reference to FIG. 6 is displayed. In the case of the negotiation mode, the screen 620 described with reference to FIG. 6 is displayed. When display processing is completed, the CPU 111 proceeds the processing to S704.

At S708, the CPU 111 determines whether an instruction for ending direct wireless communication has been received. In a case where the instruction for ending direct wireless communication has been received, the processing proceeds to S703. In a case where the instruction for ending direct wireless communication is not received yet, the processing proceeds to S709. By the determination processing of S708, the connection information used via NFC or Bluetooth® Low Energy can be also properly switched to infrastructure connection in the case of stopping direct wireless communication.

At S709, the CPU 111 determines whether a wireless communication connection request has been received from the communication terminal. In a case where the wireless communication connection request has been received from the external terminal, the processing proceeds to S710. In a case where the wireless communication connection request is not received from the external terminal yet, the processing proceeds to S711.

At S710, the CPU 111 executes connection establishment processing based on the connection request from the communication terminal. Specific control will be described with reference to the flowchart of FIG. 11.

At S1101, the CPU 111 determines whether the Bluetooth® Low Energy connection request has been received from the external terminal. When it is determined that the communication terminal (e.g., the communication terminal 102) approaches (moves closer to) the MFP 101 delivering the advertising packet, the Bluetooth® Low Energy connection request is transmitted to the MFP 101. In a case where the Bluetooth® Low Energy connection request has been received from the external terminal, the CPU 111 proceeds the processing to S1102. In a case where the Bluetooth® Low Energy connection request is not received from the external terminal yet, the CPU 111 proceeds the processing to S1105.

At S1102, the CPU 111 establishes Bluetooth® Low Energy communication with the communication terminal. The communication terminal having established Bluetooth® Low Energy communication with the MFP 101 can read and write, as necessary, the characteristics of the GATT server described with reference to FIG. 9.

At S1103, the CPU 111 determines whether a wireless LAN connection information request has been received from the communication terminal. Specifically, in a case where a request for acquiring each characteristic of the Wi-Fi® connection information notification service via GATT communication has been received from the communication terminal, the CPU 111 proceeds the processing to S1104. In a case where the request for acquiring each characteristic of the Wi-Fi® connection information notification service via GATT communication is not received from the communication terminal, the CPU 111 waits for the request from the communication terminal.

At S1104, the CPU 111 notifies the connection information as a response to the request received at S1103 by means of GATT communication. The communication terminal (e.g., the communication terminal 102) having received the connection information attempts to perform handover to the wireless LAN (wireless communication based on IEEE 802.11) based on the received connection information.

A direct wireless communication connection request will now be described. At S1105, the CPU 111 determines whether a connection request for establishing direct wireless communication has been received from the communication terminal. In a case where the connection request for establishing direct wireless communication has been received from the communication terminal, the processing proceeds to S1106. In a case where the connection request for establishing direct wireless communication has not been received from the communication terminal, a series of establishment processing ends, and the processing returns to the processing of S704 in FIG. 7.

At S1106, the CPU 111 determines the type of direct wireless communication mode. In a case where the direct wireless communication mode is the access point mode, the processing proceeds to S1108. In a case where the direct wireless communication mode is the Wi-Fi Direct® mode, the processing proceeds to S1109.

At S1108, the CPU 111 establishes direct wireless communication with the communication terminal having transmitted the connection request, and allocates the IP address to the communication terminal. When allocation is completed, a series of connection establishment processing ends, and the processing returns to the processing of S704.

At S1109, the CPU 111 determines the type of Wi-Fi Direct® mode. Specifically, the direct wireless communication settings 502 stored in the storage 114 are referred. In a case where the negotiation mode is set as the Wi-Fi Direct® mode, the processing proceeds to S1110. In a case where the Autonomous GO mode is set as the Wi-Fi Direct® mode, the processing proceeds to S1112.

At S1110, the CPU 111 performs group owner negotiation with the communication terminal having received the connection request based on the received connection request for establishing direct wireless communication, and determines which one is to be operated as the GO. In a case where it is determined that the MFP 101 is to be operated as the GO, the CPU 111 activates the software AP. In a case where it is determined that the communication terminal (e.g., the communication terminal 102) is to be operated as the GO, the CPU 111 transmits the connection information to the communication terminal.

At S1111, the CPU 111 establishes direct wireless communication with the communication terminal via Wi-Fi Direct®. In a case where the MFP 101 operates as the GO, communication with the communication terminal is established, and the IP address is allocated to the communication terminal. In a case where the communication terminal operates as the GO, the CPU 111 transmits the connection request to the communication terminal based on the connection information received from the communication terminal. The communication terminal having received the connection request establishes direct wireless communication with the MFP 101, and allocates the IP address to the MFP 101. When direct wireless communication is established between the MFP 101 and the communication terminal, a series of connection establishment processing ends, and the processing returns to the processing of S704.

At S1112, the CPU 111 establishes direct wireless communication with the communication terminal via Wi-Fi Direct®, and allocates the IP address to the communication terminal. When allocation is completed, a series of connection establishment processing ends, and the processing returns to the processing of S704.

Returning to the description of FIG. 7, at S711, the CPU 111 determines whether other instructions or other types of data have been received. In a case where other instructions or other types of data have been received, the processing proceeds to S712. In a case where other instructions or other types of data are not received, the processing proceeds to S713.

At S712, the CPU 111 executes the processing based on other instructions or other types of data. For example, the copy function processing of printing an image obtained by reading of a document on a sheet is executed. In a case where the print data has been received, printing of an image on a sheet is executed based on the print data. Other types of processing are performed based on user operation via the operation unit 116, or are performed based on an instruction received from, e.g., the cooperation application. When other types of processing are completed, the processing returns to S704.

At S713, the CPU 111 determines whether a power-OFF instruction has been received. In a case where the power-OFF instruction has been received, the processing proceeds to S714. In a case where the power-OFF instruction is not received yet, the processing returns to the processing of S704. At S714, the CPU 111 performs the processing of shutting down the MFP 101, and a series of processing ends.

As described above, in the present embodiment, the connection information provided to the external terminal by means of near field communication can be properly differentiated based on the settings and the status regarding wireless communication of the MFP 101.

Second Embodiment

Next, a second embodiment will be described. The first embodiment describes that the connection information provided to the external terminal by means of near field communication is properly differentiated based on the settings and the operation mode regarding wireless communication of the MFP 101. In addition to the first embodiment, the second embodiment describes that in a case where a MFP 101 is operating in a Wi-Fi Direct® mode, connection information provided to an external device by means of near field communication is infrastructure connection information.

In a case where direct wireless communication is established in the Wi-Fi Direct® mode, a screen for selecting whether an operation unit 116 of the MFP 101 or an operation unit 136 of a communication terminal 102 is permitted for direct connection is sometimes displayed. There are cases where permission via the screen is burdensome for a user. In a case where the user erroneously selects connection rejection on the screen or connection cannot be made due to timeout, a connection request needs to be made again. This requires great care. In light of this situation, in the present embodiment, the connection information provided to the external device by means of near field communication is the infrastructure connection information during operation in the Wi-Fi Direct® mode. Thus, when, e.g., the communication terminal 102 can access a LAN 100, the connection information is received via near field communication so that communication with the MFP 101 can be performed via the LAN 100.

In the second embodiment, a hardware configuration of an assumed device is similar to that of the first embodiment. Detailed description of configurations similar to those of the first embodiment will be omitted.

Figure 12:
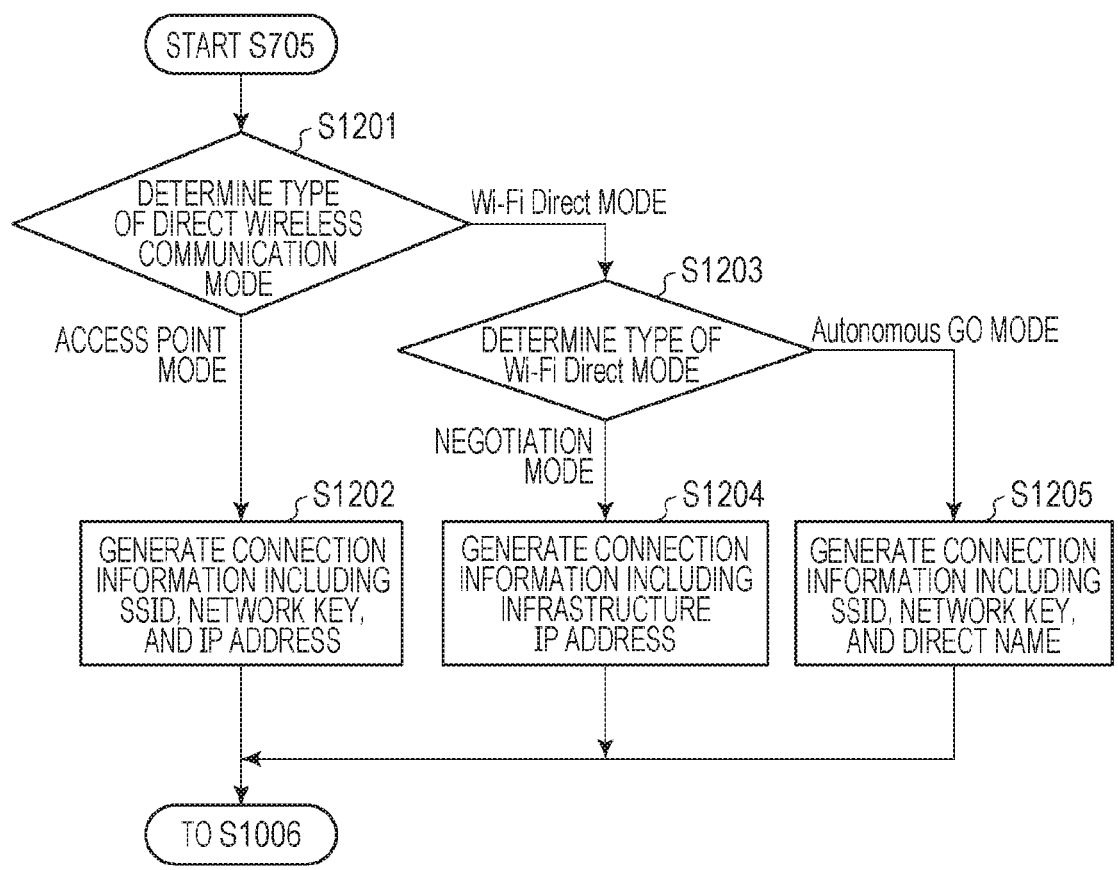
FIG. 12 is one example of the flowchart of the control of the MFP 101.

Instead of the processing of S705 of FIG. 7 of the first embodiment, a CPU 111 executes a flowchart of FIG. 12. Processing of S1201 to S1203 and S1205 is similar to the processing of S1001 to S1003 and S1005 of FIG. 10, and therefore, description thereof will be omitted.

In a case where the Wi-Fi Direct® mode is a negotiation mode, the CPU 111 generates, at S1204, the connection information including an IP address for infrastructure connection, and proceeds the processing to S1006 of FIG. 10. Control after S1006 is similar to that of the first embodiment, and therefore, description thereof will be omitted.

By such processing, the connection information provided to the external device by means of near field communication can be, in the case of the negotiation mode, the infrastructure connection information. Thus, when, e.g., the communication terminal 102 can access the LAN 100, the connection information is received via near field communication so that communication with the MFP 101 can be performed via the LAN 100.

In the second embodiment, FIGS. 13A and 13B illustrate one example of the screen displayed on the operation unit 116 instead of the screen 620 and the screen 630 illustrated in FIG. 6 as described in the first embodiment. A screen 1320 of FIG. 13A is one example of the screen displayed instead of the screen 620 for displaying the connection information in the negotiation mode. A screen 1330 of FIG. 13B is one example of the screen displayed instead of the screen 620 for displaying the connection information in an Autonomous GO mode.

In the case of devices participating in the same network, information 1325 indicating that connection with the MFP 101 can be made using NFC or Bluetooth® Low Energy is displayed in addition to each display item of the screen 620 on the screen 1320. Information 1326 indicating an IP address for accessing the MFP 101 via the LAN 100 is displayed as the connection information regarding infrastructure connection. Information 1335 as information similar to the information 1325 and information 1336 as information similar to the information 1326 are also displayed on the screen 1330. Such displaying can properly notify the user of the necessity for participation of the communication terminal 102 in the same network for handover by near field communication when the MFP 101 is operating in the Wi-Fi Direct® mode.

<Variations>

In the second embodiment, the case where the infrastructure connection information is provided via near field communication in the Wi-Fi Direct® mode has been described as an example, but this example is not limiting. For example, in the case of operation in the Wi-Fi Direct® Autonomous GO mode, the connection information (the SSID, the key) for accessing the software AP may be, without the direct name, provided via near field communication. This focuses on availability of connection with the software AP activated for Wi-Fi Direct® without use of a Wi-Fi Direct® connection procedure. As long as the communication terminal 102 can obtain the SSID and the key for connection with the software AP activated by the MFP 101, the communication terminal 102 can be also connected with the Wi-Fi Direct® access point at a normal access point connection step. In this case, even when operation is performed in the Wi-Fi Direct® mode, if operation is performed in the Autonomous GO mode, the CPU 111 can provide the connection information similar to that of S1202 to the external terminal via near field communication. Specifically, in a case where it is, at S1203, determined as the Autonomous GO mode, the processing can proceed to the processing of S1202. In this case, information such as "MFP 101 can be directly connected using NFC/Bluetooth® Low Energy" is displayed instead of the information 1335 on the screen 1330. The infrastructure connection information indicated by the information 1336 is unnecessary information for connection with the software AP of the MFP 101, and therefore, is not displayed.

In the above-described embodiments, GATT communication has been described as an example of the method for notifying the connection information to the external terminal by means of Bluetooth® Low Energy, but this example is not limiting. For example, the advertising packet of Bluetooth® Low Energy can include the connection information for handover.

Other Embodiments

In the present embodiments, the access point mode and the Wi-Fi Direct® mode have been described as examples of the direct wireless communication mode, but these examples are not seen to be limiting. For example, a case where the MFP 101 enables a direct wireless communication mode (for the sake of description, referred to as a "Wi-Fi Aware® mode") based on Wi-Fi Aware® is assumed. In this case, when the MFP 101 is operating in the Wi-Fi Aware® mode, connection information necessary for connection in the Wi-Fi Aware® mode may be set as the connection information notified via near field communication.

As described above, according to each of the above-described embodiments, the mechanism for enhancing user friendliness in the case of exchanging data with the external terminal via wireless communication can be provided.

The mechanism for properly differentiating the connection information provided to the external terminal by means of near field communication based on the settings and status of the information processing device regarding wireless communication can be provided.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been provided, it is to be understood that disclosed exemplary embodiments are not limiting. The scope of the following claims is to be accorded the broadest interpretation so as to encompass all such modifications and equivalent structures and functions.

This application claims the benefit of Japanese Patent Application No. 2017-201418, filed Oct. 17, 2017, which is hereby incorporated by reference herein in its entirety.

What is claimed is:

1. An information processing device comprising:
a wireless network interface;
a first setting unit configured to set whether direct wireless communication using the wireless network interface is to be a first mode for performing direct wireless communication based on Wi-Fi Direct® or a second mode for operating the information processing device as an access point not based on Wi-Fi Direct® and performing direct wireless communication via the access point; and
a providing unit configured to provide, in a method different from the wireless communication using the wireless network interface, an external device with connection information for establishing network communication between the external device and the information processing device,
wherein the providing unit controls to provide connection information about the access point by the different method in a case where a direct wireless communication function is started in the second mode, and to provide connection information not including information for establishing the direct wireless communication based on Wi-Fi Direct® but including an IP address allocated to the information processing device in a case where the direct wireless communication function is started in the first mode.

2. The information processing device according to claim 1, wherein
the wireless communication using the wireless network interface is wireless communication based on IEEE 802.11, and
the providing unit provides the connection information to the external device via near field communication different from the network communication using the wireless network interface.

3. The information processing device according to claim 2, wherein
the near field communication includes one or more of NFC communication based on ISO/IEC 21481 or ISO/IEC 18092 or Bluetooth® Low Energy communication.

4. The information processing device according to claim 3, wherein
in association with a change in a setting or an operation mode regarding the wireless network interface, the providing unit rewrites, based on the setting and the operation mode, a characteristic of a GATT server used for the Bluetooth® Low Energy communication, thereby differentiating the connection information acquirable by the external device via the Bluetooth® Low Energy communication.

5. The information processing device according to claim 3, further comprising:
an NFC tag,
wherein in association with a change in a setting or an operation mode regarding the wireless network interface, the providing unit differentiates, based on the setting and the operation mode, connection information in tag data written in the NFC tag.

6. The information processing device according to claim 5, wherein in addition to the connection information, identification information indicating an application required to be activated by an external terminal is included in the NFC tag data.

7. The information processing device according to claim 1, further comprising:
an operation unit,
wherein the providing unit further displays a two-dimensional code including the connection information on the operation unit, and causes the external device to read the two-dimensional code to provide the connection information to the external device.

8. The information processing device according to claim 1, further comprising:
a second setting unit configured to set whether an Autonomous GO mode is validated as the first mode,
wherein the information processing device starts a software access point as a group owner of Wi-Fi Direct® in a case where the second setting unit sets the Autonomous GO mode to valid and the direct wireless communication function is started in the first mode, and
wherein the providing unit provides connection information about the software access point by the different method in a case where the information processing device is operated as the group owner even if the direct wireless communication function is started in the first mode.

9. The information processing device according to claim 8, wherein
in a case where the second setting unit sets the Autonomous GO mode to valid and the direct wireless communication function is started in the first mode, the providing unit provides, as the connection information for establishing the communication, connection information including at least a service set identifier (SSID) and a password for connection with the software access point of the information processing device and a device name used for the Wi-Fi Direct®.

10. The information processing device according to claim 9, further comprising:
a third setting unit configured to set whether use of the direct wireless communication via the wireless network interface is permitted,
wherein in association with non-setting of permission of use of the direct wireless communication by the third setting unit, the providing unit provides connection information including an IP address allocated to the information processing device and not including the SSID, the password, and the device name.

11. The information processing device according to claim 10, further comprising:
a fourth setting unit configured to set, based on user operation, whether the direct wireless communication is to be used,
wherein in a case where the direct wireless communication function is not started, the providing unit provides the connection information including the IP address allocated to the information processing device and not including the SSID, the password, and the device name.

12. The information processing device according to claim 1, wherein
the information processing device is a printing device.

13. The information processing device according to claim 1, wherein
the IP address of the information processing device is an IP address allocated for the information processing device for communicating with a communication terminal on a local area network different from a Peer-to-Peer network constructed using the direct wireless communication function, in a case of using the direct wireless communication based on Wi-Fi Direct®, and provides connection information including at least information for connection with a software access point of the information processing device in a case of using the direct wireless communication not based on Wi-Fi Direct®.

14. A method for controlling an information processing device including a wireless network interface, the method comprising:
  setting whether direct wireless communication using the wireless network interface is to be a first mode for performing wireless communication based on Wi-Fi Direct® or a second mode for operating the information processing device as an access point not based on Wi-Fi Direct® and performing direct wireless communication via the access point; and
  providing, in a method different from the wireless communication using the wireless network interface, an external device with connection information for establishing network communication between the external device and the information processing device,
  wherein at the providing, connection information about the access point by the different method is provided in a case where a direct wireless communication function is started in the second mode, and connection information not including information for establishing the direct wireless communication based on Wi-Fi Direct® but including an IP address allocated to the information processing device is provided in a case where the direct wireless communication function is started in the first mode.

15. A non-transitory storage medium storing a computer-readable program for causing a computer to execute a method for controlling an information processing device including a wireless network interface, the method comprising:
  setting whether direct wireless communication using the wireless network interface is to be a first mode for performing wireless communication based on Wi-Fi Direct® or a second mode for operating the information processing device as an access point not based on Wi-Fi Direct® and performing direct wireless communication via the access point; and
  providing, in a method different from the wireless communication using the wireless network interface, an external device with connection information for establishing network communication between the external device and the information processing device,
  wherein at the providing, connection information about the access point by the different method is provided in a case where a direct wireless communication function is started in the second mode, and connection information not including information for establishing the direct wireless communication based on Wi-Fi Direct® but including an IP address allocated to the information processing device is provided in a case where the direct wireless communication function is started in the first mode.

* * * * *